US009228091B2

(12) United States Patent
Doi et al.

(10) Patent No.: US 9,228,091 B2
(45) Date of Patent: Jan. 5, 2016

(54) FERRITE THIN FILM-FORMING COMPOSITION MATERIAL, METHOD OF FORMING FERRITE THIN FILM, AND FERRITE THIN FILM FORMED USING THE SAME (71) Applicant: MITSUBISHI MATERIALS CORPORATION, Tokyo (JP)

(72) Inventors: Toshihiro Doi, Naka (JP); Hideaki Sakurai, Naka (JP); Kenzo Nakamura, Naka (JP); Kazunori Igarashi, Naka (JP); Nobuyuki Soyama, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 114 days.

(21) Appl. No.: 13/830,057

(22) Filed: Mar. 14, 2013

(65) Prior Publication Data
US 2013/0256582 A1 Oct. 3, 2013

(30) Foreign Application Priority Data

Mar. 29, 2012 (JP) ................................ 2012-076981

(51) Int. Cl.
*C09D 1/00* (2006.01)
*H01L 21/316* (2006.01)
(Continued)

(52) U.S. Cl.
CPC .............. *C09D 5/23* (2013.01); *C23C 18/1216* (2013.01); *C23C 18/1245* (2013.01);
(Continued)

(58) Field of Classification Search
USPC ......... 106/287.18, 286.1, 286.2, 286.3, 286.6
See application file for complete search history.

(56) References Cited

U.S. PATENT DOCUMENTS 6,114,188 A * 9/2000 Oliver ..................... C04B 41/81
257/E21.122
6,287,639 B1 * 9/2001 Schmidt ................ C03C 17/007
427/387

(Continued)

FOREIGN PATENT DOCUMENTS

JP H03-023226 A 1/1991
JP H09-241008 A 9/1997
(Continued)

OTHER PUBLICATIONS

F. Liu et al., "NiCuZn ferrite thin films grown by a sol-gel method and rapid thermal annealing," Journal of Magnetism and Magnetic Materials, 309 (2007) pp. 75-79.

(Continued)

*Primary Examiner* — James McDonough
(74) *Attorney, Agent, or Firm* — Locke Lord LLP; James E. Armstrong, IV; Nicholas J. DiCeglie, Jr.

(57) ABSTRACT

To provide a ferrite thin film-forming composition material that is a composition material for forming a ferrite thin film by using the sol-gel method which can form a thin ferrite thin film having a uniform thickness and, furthermore, has excellent long-term storage stability, a method of forming a ferrite thin film using the above composition material, and a ferrite thin film formed by using the above method. A ferrite thin film-forming composition material is a composition material for forming a NiZn ferrite, CuZn ferrite, or NiCuZn ferrite thin film by using a sol-gel method, in which the composition material is formed by dissolving metallic raw materials in a solvent including acetonitrile, and the fraction of acetonitrile is 30 mass % to 60 mass % with respect to 100 mass % of the composition material.

8 Claims, 5 Drawing Sheets

(51) Int. Cl.
  *C09D 5/23* (2006.01)
  *H01F 41/22* (2006.01)
  *C23C 18/12* (2006.01)
  *H01F 10/20* (2006.01)
  *H01F 41/24* (2006.01)

(52) U.S. Cl.
  CPC ........ *C23C 18/1254* (2013.01); *C23C 18/1283* (2013.01); *H01F 10/20* (2013.01); *H01F 41/22* (2013.01); *H01F 41/24* (2013.01)

(56) References Cited

U.S. PATENT DOCUMENTS

2003/0003324 A1* 1/2003 Fleming ................ B82Y 30/00
                                                        428/836.1
2009/0035457 A1* 2/2009 Heo .................... C23C 18/1254
                                                        427/126.3

FOREIGN PATENT DOCUMENTS

| JP | 2005-175102 A | 6/2005 |
|---|---|---|
| JP | 2006-210616 A | 8/2006 |
| JP | 2009-221071 A | 10/2009 |
| JP | 2010-530137 A | 9/2010 |
| WO | WO-2008-156680 A1 | 12/2008 |

OTHER PUBLICATIONS

Gao Liang-Qiu et al., "Condensed Matter: Electronic Structure, Electrical, Magnetic, and Optical Properties; Study of NiCuZn ferrite powders and films prepared by solgel method", Chinese Physics B, vol. 20, No. 2, Feb. 4, 2011, pp. 027503-1 to 023503-5.

R.E. van de Leest et al., "Nickel-zinc ferrite films by rapid thermal processing of sol-gel precursors", Applied Surface Science, vol. 187, No. 1-2, Feb. 1, 2002, pp. 68 to 74.

Extended European Search Report dated Jun. 21, 2013, issued for the corresponding European patent application No. 13160994.3.

F. Liu et al., "NiCuZn ferrite thin films grown by a sol-gel method and rapid thermal annealing," Journal of Magnetism and Magnetic Materials, 309 (2007) p. 75 to 79.

First Office Action, issued in corresponding Japanese Patent Application No. JP 2012-076981, dated Jun. 9, 2015.

* cited by examiner

FERRITE THIN FILM-FORMING COMPOSITION MATERIAL, METHOD OF FORMING FERRITE THIN FILM, AND FERRITE THIN FILM FORMED USING THE SAME

TECHNICAL FIELD

The present invention relates to a ferrite thin film-forming composition material for forming a magnetic film or the like in a thin film inductor embedded in an integrated passive device (IPD) chip by using a sol-gel method, a method of forming a ferrite thin film using this composition material, and a ferrite thin film formed by using this method.

BACKGROUND ART

In recent years, there has been an abrupt demand for a decrease in size and weight of a variety of electronic devices, and thus there is a demand for a decrease in size or thickness of a condenser, an inductor, or the like which is embedded in an IPD chip having a plurality of passive elements formed on a substrate. For a decrease in the thickness of an inductor, compared to a wirewound inductor of the related art having a structure in which a wire is wound in a bulk magnetic material, for example, a thin film inductor or the like having a structure in which a spiral planar coil is inserted in a magnetic material such as a ferrite is proposed.

Since a magnetic material used in an inductor generally shows a high magnetic permeability in a high frequency range, a ferrite thin film or the like formed by using a ferrite-based material has been thus far used widely. Thus far, as a method of manufacturing a ferrite thin film, researches and developments have been made mainly for a forming method in which a vacuum process such as a sputtering method or chemical vapor deposition is required; however, in this method, it was necessary to introduce an expensive apparatus to the process, and thus there was a problem with costs such as an increase in initial investment. Meanwhile, while a forming method or the like by using a spin spraying method to which non-electrolytic plating is applied has been also studied; however, in the spin spraying method, while there is a merit that a ferrite film can be formed by using a relatively cheap apparatus, since a liquid including a large amount of a raw material is used during forming of a film, there was a problem in terms of the environment.

Therefore, a sol-gel method is attracting attention as a method of forming a ferrite thin film, which is not a spin spraying method and replaces a sputtering method or the like. In the sol-gel method, a vacuum process, which is used in the sputtering method or the like, is not required, and a ferrite thin film can be formed by using relatively simple and low-cost processes of preparation, coating, drying, and firing of a composition material. As a method of forming a ferrite thin film by using the sol-gel method, in the past, a method of forming a NiCuZn ferrite thin film by coating a mixed solution including iron nitrate, nickel nitrate, N,N-dimethylformamide, zinc acetate, and copper nitrate on a Si substrate on which $SiO_2$ is formed by using a spin coating method, drying the Si substrate on which the mixed solution is coated at 120° C. for 10 minutes so as to remove the solvent, and heating the resultant at 400° C. for 30 minutes so as to be thermal decomposed was disclosed (for example, refer to Non Patent Document 1).

RELATED ART DOCUMENT

Non Patent Document

[Non Patent Document 1] Journal of Magnetism and Magnetic Materials, 309 (2007) p. 75 to 79 (2. Experimental in p. 75 and 76)

DISCLOSURE OF THE INVENTION

Problem that the Invention is to Solve

However, in the forming method of the related art disclosed in Non Patent Document 1, a mixed solution in which a formamide-based solvent is used as the solvent is used as a composition material for forming a ferrite thin film. In a film formed by using this composition material (the mixed solution), there was a problem in that it was difficult to further improve characteristics such as magnetic permeability. One of the reasons for the above is considered to be that, for example, when the composition material is coated on a substrate by using a spin coating method or the like, it is difficult to further improve coating properties, film thickness uniformity, and the like due to the solvent being used and the like, and, consequently, improvement of the film density and the like cannot be achieved any more in the formed thin film.

In addition, the composition material of the related art described in Non Patent Document 1 has poor long-term storage stability, and tends to cause liquid sedimentation over time, and therefore there was a problem in that the coated film properties were poor. Therefore, when forming a ferrite thin film by using the sol-gel method, there is a demand for additional improvement in the coated film properties and the like from the viewpoint of improvement of materials, there has been a demand for development of a ferrite thin film forming composition material which does not cause liquid sedimentation and the like even when stored for a long period of time, and can maintain excellent coated film properties for a long period of time.

An object of the invention is to provide a ferrite thin film-forming composition material that is a composition material for forming a ferrite thin film by using the sol-gel method which can form a thin ferrite thin film having a uniform thickness and has excellent long-term storage stability, a method of forming a ferrite thin film using the above composition material, and a ferrite thin film formed by using the above method.

Means for Solving the Problem

A first aspect of the invention is a composition material for forming a ferrite thin film having a composition material represented by $(Ni_{1-x}Zn_xO)_t(Fe_2O_3)_s$, $(Cu_{1-x}Zn_xO)_t(Fe_2O_3)_s$ or $(Ni_{0.80-y}Cu_{0.20}Zn_yO)_t(Fe_2O_3)_s$ by using a sol-gel method, in which the composition material is formed by dissolving metallic raw materials in a solvent including acetonitrile, and the fraction of acetonitrile is 30 mass % to 60 mass % with respect to 100 mass % of the composition material. However, x satisfies 0<x<1, y satisfies 0<y<0.80, s and t satisfy 0.95≤s≤1.05 and 0.95≤t≤1.05 respectively, and s+t=2.

A second aspect of the invention is an invention based on the first aspect, in which, furthermore, the metallic raw materials are metal alkoxides, acetates, naphthenates, and nitrates of Ni, Zn, Cu or Fe.

A third aspect of the invention is an invention based on the first or second aspect, in which, furthermore, in a ferrite thin film having a composition represented by $(Ni_{1-x}Zn_xO)_t$ $(Fe_2O_3)_s$, x is within a range of $0.10 \leq x \leq 0.65$.

A fourth aspect of the invention is an invention based on the first or second aspect, in which, furthermore, in a ferrite thin film having a composition represented by $(Cu_{1-x}Zn_xO)_t$ $(Fe_2O_3)_s$, x is within a range of $0.20 \leq x \leq 0.80$.

A fifth aspect of the invention is an invention based on the first or second aspect, in which, furthermore, in a ferrite thin film having a composition represented by $(Ni_{0.80-y}Cu_{0.20}Zn_yO)_t(Fe_2O_3)_s$, y is within a range of $0.20 \leq y \leq 0.40$.

A sixth aspect of the invention is a method of forming a ferrite thin film in which a film is formed by using the ferrite thin film-forming composition material according to the first to fifth aspects and a sol-gel method.

A seventh aspect of the invention is a ferrite thin film formed by using the method forming a ferrite thin film according to the sixth aspect.

Advantage of the Invention

The ferrite thin film-forming composition material according to the first aspect of the invention is a composition material for forming a NiZn ferrite, CuZn ferrite, or NiCuZn ferrite thin film by using a sol-gel method, in which the composition material is formed by dissolving metallic raw materials in a solvent including acetonitrile, and the fraction of acetonitrile is 30 mass % to 60 mass % with respect to 100 mass % of the composition material. As such, in the ferrite thin film-forming composition material of the invention, since acetonitrile is included at a predetermined fraction as the solvent, the coated film properties are excellent while forming a film, and the storage stability of the composition material is excellent compared to a composition material of the related art in which a-based solvent is used.

In the ferrite thin film-forming composition material according to the second aspect of the invention, metal alkoxides, acetates, naphthenates, or nitrates of Ni, Zn, Cu or Fe are used as the metallic raw materials. Thereby, it is possible to further improve the storage stability of the composition material.

In the ferrite thin film-forming composition material according to the third aspect of the invention, in a ferrite thin film having a composition represented by $(Ni_{1-x}Zn_xO)_t$ $(Fe_2O_3)_s$, x is within a range of $0.10 \leq x \leq 0.65$. Thereby, the magnetic permeability of a thin film to be formed is high, and the loss of a film is reduced.

In the ferrite thin film-forming composition material according to the fourth aspect of the invention, in a ferrite thin film having a composition represented by $(Cu_{1-x}Zn_xO)_t$ $(Fe_2O_3)_s$, x is within a range of $0.20 \leq x \leq 0.80$. Thereby, the magnetic permeability of a thin film to be formed is high, and the loss of a film is reduced.

In the ferrite thin film-forming composition material according to the fifth aspect of the invention, in a ferrite thin film having a composition represented by $(Ni_{0.80-y}Cu_{0.20}Zn_yO)_t(Fe_2O_3)_s$, y is within a range of $0.20 \leq y \leq 0.40$. Thereby, the magnetic permeability of the formed thin film is increased, and the loss of the film is decreased.

In the method of forming a ferrite thin film according to the sixth aspect of the invention, since the ferrite thin film-forming composition material of the invention is used, it is possible to uniformly coat the composition material on the entire surface of the substrate, and to form a uniform thin film. In addition, since a sol-gel method using the above composition material is used in the forming method, a vacuum process such as CVD is not required, and it is possible to readily form a thin film at low costs.

Since the ferrite thin film according to the seventh aspect of the invention is formed by using the forming method of the invention, is an extremely thin and uniform thin film, and exhibits a desired magnetic permeability in a high frequency range, when the ferrite thin film is used in a magnetic material including a magnetic film of a thin film inductor which is used in a high frequency range, it is possible to decrease the size of an inductor and to improve the characteristics such as Q value.

BEST MODE FOR CARRYING OUT THE INVENTION

Next, embodiments for carrying out the invention will be described.

The ferrite thin film-forming composition material of the invention is a composition material for forming a ferrite thin film having a composition represented by $(Ni_{1-x}Zn_xO)_t$ $(Fe_2O_3)_s$, $(Cu_{1-x}Zn_xO)_t(Fe_2O_3)_s$ or $(Ni_{0.80-y}Cu_{0.20}Zn_yO)_t$ $(Fe_2O_3)_s$ by using a sol-gel method. In addition, the composition material is formed by dissolving metallic raw materials in a solvent including acetonitrile, and the fraction of acetonitrile is 30 mass % to 60 mass %, and preferably 35 mass % to 50 mass % with respect to 100 mass % of the composition material. However, x satisfies $0<x<1$, y satisfies $0<y<0.80$, s and t satisfy $0.95 \leq s \leq 1.05$ and $0.95 \leq t \leq 1.05$ respectively, and $s+t=2$. Thereby, the ferrite thin film-forming composition material of the invention has extremely excellent coating properties compared to a composition material using a formamide-based solvent, which was used in the past, when a ferrite thin film is formed by using the sol-gel method. Therefore, if this composition material is used, when the composition material is coated on a substrate by using, for example, a spin coating method, it is possible to uniformly coat the composition material on the entire surface of a substrate, and to form a thin ferrite thin film having a uniform film thickness. Furthermore, the ferrite thin film-forming composition material of the invention is excellent in terms of storage stability without the occurrence of liquid sedimentation even when stored for a long period of time.

The reason for including acetonitrile as the solvent is that, due to a high affinity to propylene glycol or ethanol, which is another solvent, the coated film properties improve compared to a composition material of the related art in which a formamide-based solvent is used. In addition, this is because acetonitrile is a precursor substance, and therefore the storage stability improves without the occurrence of liquid sedimentation even when storing the solvent including acetonitrile for a long period of time. In addition, the reason for limiting the content fraction of acetonitrile to the above range is that, when the content fraction of acetonitrile is less than the lower limit value, the storage stability degrades, and a disadvantage of the occurrence of liquid sedimentation is caused, and, on the other hand, when the fraction exceeds the upper limit value, the coated film properties conversely become poor.

As the solvent, it is possible to jointly use other solvents such as a lower alcohol such as ethanol or a diol such as propylene glycol along with acetonitrile. When a solvent other than acetonitrile is jointly used, it is possible to adjust the viscosity of a liquid or the volatile properties of a solvent. The number of other solvents used may be one or two or more. The blending fraction of the solvent other than acetonitrile is preferably set to 15 mass % to 60 mass % with respect to 100 mass % of the manufactured composition material.

The ferrite thin film-forming composition material of the invention is a composition material for forming particularly a NiZn ferrite, CuZn ferrite, or NiCuZn ferrite thin film among ferrite thin films, and, specifically, a composition for forming a ferrite thin film having a composition represented by the above three composition formulae, that is, $(Ni_{1-x}Zn_xO)_t(Fe_2O_3)_s$, $(Cu_{1-x}Zn_xO)_t(Fe_2O_3)_s$ or $(Ni_{0.80-y}Cu_{0.20}Zn_yO)_t(Fe_2O_3)_s$. The metallic raw materials included in the composition material are included at an appropriate fraction for the composition of the respective target ferrite thin films.

Here, in the ferrite thin film formed by using the composition of the invention, the reason for limiting s and t to $0.95 \leq s \leq 1.05$, $0.95 \leq t \leq 1.05$, and $s+t=2$ is that, when s and t are outside the above range, there occurs a disadvantage of a decrease in the initial magnetic permeability or the resistance value in a formed thin film.

In addition, in a ferrite thin film having a composition represented by $(Ni_{1-x}Zn_xO)_t(Fe_2O_3)_s$, x is preferably within a range of $0.10 \leq x \leq 0.65$. This is because, when x is less than the lower limit value or exceeds the upper limit value, the fraction of Ni to Zn becomes too small or too large, and there is a tendency for the initial magnetic permeability or the resistance value to decrease in a formed thin film.

In addition, in a ferrite thin film having a composition represented by $(Cu_{1-x}Zn_xO)_t(Fe_2O_3)_s$, x is preferably within a range of $0.20 \leq x \leq 0.80$. This is because, when x is less than the lower limit value or exceeds the upper limit value, the fraction of Cu to Zn becomes too small or too large, and there is a tendency for the initial magnetic permeability or the resistance value to decrease in a formed thin film.

In addition, in a ferrite thin film having a composition represented by $(Ni_{0.80-y}Cu_{0.20}Zn_yO)_t(Fe_2O_3)_s$, y is preferably within a range of $0.20 \leq y \leq 0.40$. This is because, when y is less than the lower limit value or exceeds the upper limit value, the fraction of Ni to Zn or Cu becomes too small or too large, and there is a tendency for the initial magnetic permeability or the resistance value to decrease in a formed thin film.

Examples of the metallic raw materials included in the composition material at a fraction according to a composition of the formed ferrite thin film include metal alkoxides, acetates, naphthenates, and nitrates of Ni, Zn, Cu or Fe. Specific examples include nickel nitrate (II) hexahydrate, zinc nitrate (II) tetrahydrate, copper nitrate (II) trihydrate, iron nitrate (III) nonahydrate, nickel acetate (II) tetrahydrate, zinc acetate (II) dihydrate, iron naphthenate, iron (III) triethoxide, and the like. Among the above, nitrates such as nickel nitrate (II) hexahydrate, zinc nitrate (II) tetrahydrate, copper nitrate (II) trihydrate and iron nitrate (III) nonahydrate, and acetates such as nickel acetate (II) tetrahydrate are particularly preferable for a reason of the storage stability of the composition material. The fraction of the metallic materials is preferably adjusted so that the total fraction of the metallic materials in the composition material becomes 2 mass % to 15 mass % in terms of the amount of the metallic oxides.

In order to prepare the ferrite thin film-forming composition material of the invention, firstly, the metallic materials are prepared, and are weighed respectively so as to obtain a target composition of the ferrite thin film. In addition, acetonitrile at an amount corresponding to 30 mass % to 60 mass %, or preferably 35 mass % to 50 mass %, with respect to 100 mass % of the prepared composition material and, as the solvent other than acetonitrile, the above other solvents at an amount corresponding to preferably 15 mass % to 60 mass % with respect to 100 mass % of the prepared composition material is prepared.

Next, the above weighed metallic materials are mixed in acetonitrile and the other solvents, stirred in an oil bath or an ice bath at a temperature of preferably 0° C. to 30° C. for 0.5 hours to 24 hours so as to be dissolved, then, the other solvents, such as propylene glycol or n-butanol, is further added so as to adjust the total fraction of the metallic materials in the composition material to be preferably 5 mass % to 7 mass % in terms of the amount of the oxides. The solution is further stirred at room temperature for preferably 2 hours to 24 hours, whereby the ferrite thin film-forming composition material can be obtained.

Subsequently, the method of forming a ferrite thin film by using the sol-gel method according to the invention will be described. Firstly, a coated film is formed by coating the ferrite thin film-forming composition material on a substrate. Preferable examples of the substrate on which the ferrite thin film is formed include heat-resistant substrates such as silicon substrates, such as a $Si/SiO_2$ substrate, and alumina substrates. Examples of the coating method of the ferrite thin film-forming composition material onto the substrate include a spin coating method, a dip coating method, a liquid source misted chemical deposition (LSMCD) method, and the like. Among the above, the spin coating method is particularly preferable since a high surface flatness can be obtained.

In addition, the coating amount of the composition material is preferably set to an amount at which the film thickness of a finally obtained ferrite thin film becomes 50 nm to 200 nm. Meanwhile, the composition material may be coated on the substrate once; however, for preventing cracking, an operation in which the composition material is coated, then, calcination is carried out preferably under the conditions below, and then the composition material is further coated may be carried out a plurality of times, preferably twice to twenty times. In this case, the coating amount in a single coating is preferably set to an amount at which the film thickness of the coated film formed by a single time of coating becomes 50 nm to 150 nm.

Next, the coated film formed on the substrate or the calcined film after calcination is calcined under the atmosphere or oxygen gas atmosphere preferably at a temperature of 100° C. to 450° C. for a holding time of one minute to 30 minutes, and more preferably under conditions of a temperature of 400° C. to 450° C. for a holding time of 5 minutes to 15 minutes, thereby forming an amorphous-form calcined film. The thickness of the calcined film is preferably set to 90 nm to 3000 nm in total thickness. The process of calcining the coated film is preferably carried out by using hot plating (HP), rapid thermal annealing (RTA), or the like.

Finally, a film-attached substrate on which the calcined film is formed is fired so as to obtain a ferrite thin film. Firing can be carried out under the atmosphere or oxygen gas atmosphere preferably at a temperature of 500° C. to 800° C. for a holding time of 30 minutes to 120 minutes, and more preferably under conditions of at a temperature of 700° C. to 800° C. for a holding time of one minute to 60 minutes by using rapid thermal annealing (RTA), an electric furnace, a muffle furnace, or the like.

The ferrite thin film of the invention can be formed by using the above processes. Since the ferrite thin film of the invention is a thin film formed by using the ferrite thin film-forming composition material of the invention, the thin film is an extremely thin uniform thin film, and exhibits a desired magnetic permeability in a high frequency range. Therefore, when the ferrite thin film is used in a magnetic material including a magnetic film of a thin film inductor used in a high frequency range, it is possible to decrease the size of the inductor or improve the characteristics.

EXAMPLES

Next, examples of the invention will be described in detail along with comparative examples.

Example 1-1

Firstly, as metallic materials, nickel nitrate (II) hexahydrate, zinc nitrate (II) tetrahydrate and iron nitrate (III) nonahydrate were prepared and weighed respectively so that the composition of a formed ferrite thin film became $(Ni_{0.64}Zn_{0.36}O)_{1.0}(Fe_2O_3)_{1.0}$. In addition, acetonitrile was prepared as the solvent at an amount corresponding to 30 mass % with respect to 100 mass % of the prepared composition material, propylene glycol was prepared as another solvent at an amount corresponding to 10 mass %, these solvents were added to and mixed with the metallic materials, and the solution was stirred at a temperature of 30° C. for 6 hours in an oil bath.

After stirring, 37.2 mass % of butanol with respect to 100 mass % of the prepared composition material was further added as still another solvent, and the total fraction of the metallic materials in the composition material was adjusted to become 5 mass % in terms of the amount of metallic oxides. After that, the solution was further stirred at room temperature for 24 hours so as to prepare a ferrite thin film-forming composition material.

Next, the prepared ferrite thin film-forming composition material was spin-coated at a rotation rate of 3000 rpm for 15 seconds so as to form a coated film on a silicon substrate having a $SiO_2$ film on the surface, and then was calcined at a temperature of 400° C. for 5 minutes. The processes from coating to calcination were repeated five times so as to form an amorphous-form calcined film having a thickness shown in Table 1.

Finally, the film-attached substrate was fired at 700° C. by using RTA so as to form a NiZn ferrite thin film which had a composition of $(Ni_{0.64}Zn_{0.36}O)_{1.0}(Fe_2O_3)_{1.0}$ and a thickness shown in Table 1.

Examples 1-2 and 1-3, and Comparative Examples 1-1 and 1-2

Ferrite thin film-forming composition materials were prepared, and NiZn ferrite thin films having thickness shown in Table 1 were formed in the same manner as in Example 1-1 except that the fraction of acetonitrile was set to fractions shown in the following table 1 when the prepared composition material was set to 100 mass %.

Examples 1-4 to 1-9, and Comparative Examples 1-3 to 1-6

Ferrite thin film-forming composition materials were prepared, and NiZn ferrite thin films having thickness shown in Table 1 were formed in the same manner as in Example 1-1 or 1-2 except that the fractions of the respective metallic materials were adjusted so that the compositions of the formed ferrite thin films became compositions shown in the following table 1.

Example 2-1

Firstly, as metallic materials, copper nitrate (II) trihydrate, zinc nitrate (II) tetrahydrate and iron nitrate (III) nonahydrate were prepared and weighed respectively so that the composition of a formed ferrite thin film became $(Cu_{0.40}Zn_{0.60}O)_{1.0}(Fe_2O_3)_{1.0}$. In addition, acetonitrile was prepared as the solvent at an amount corresponding to 30 mass % with respect to 100 mass % of the prepared composition material, propylene glycol was prepared as another solvent at an amount corresponding to 10 mass %, these solvents were added to and mixed with the metallic materials, and the solution was stirred at a temperature of 30° C. for 6 hours by using an oil bath.

After stirring, 42.5 mass % of ethanol with respect to 100 mass % of the prepared composition material was further added as still another solvent, and the total fraction of the metallic materials in the composition material was adjusted to become 4 mass % in terms of the amount of metallic oxides. After that, the solution was further stirred at room temperature for 24 hours so as to prepare a ferrite thin film-forming composition material.

Next, the prepared ferrite thin film-forming composition material was spin-coated at a rotation rate of 3000 rpm for 15 seconds so as to form a coated film on a silicon substrate having a $SiO_2$ film on the surface, and then was calcined at a temperature of 400° C. for 5 minutes. The processes from coating to calcination were repeated five times so as to form an amorphous-form calcined film having a thickness shown in Table 2.

Finally, the film-attached substrate was fired at 700° C. by using RTA so as to form a NiZn ferrite thin film which had a composition of $(Cu_{0.40}Zn_{0.60}O)_{1.0}(Fe_2O_3)_{1.0}$ and a thickness shown in Table 2.

Examples 2-2 and 2-3, and Comparative Examples 2-1 and 2-2

Ferrite thin film-forming composition materials were prepared, and CuZn ferrite thin films having thickness shown in Table 2 were formed in the same manner as in Example 2-1 except that the fraction of acetonitrile was set to fractions shown in the following table 2 when the prepared composition material was set to 100 mass %.

Examples 2-4 to 2-9, and Comparative Examples 2-3 to 2-6

Ferrite thin film-forming composition materials were prepared, and CuZn ferrite thin films having thickness shown in Table 2 were formed in the same manner as in Example 2-1 or 2-2 except that the fractions of the respective metallic materials were adjusted so that the compositions of the formed ferrite thin films became compositions shown in the following table 2.

Example 3-1

Firstly, as metallic materials, nickel acetate (II) tetrahydrate, copper nitrate (II) trihydrate, zinc nitrate (II) tetrahydrate and iron nitrate (III) nonahydrate were prepared and weighed respectively so that the composition of a formed ferrite thin film became $(Ni_{0.40}Cu_{0.20}Zn_{0.40}O)_{1.0}(Fe_2O_3)_{1.0}$. In addition, acetonitrile was prepared as the solvent at an amount corresponding to mass % with respect to 100 mass % of the prepared composition material, propylene glycol was prepared as another solvent at an amount corresponding to 15 mass %, these solvents were added to and mixed with the metallic materials, and the solution was stirred at a temperature of 30° C. for 6 hours by using an oil bath.

After stirring, 22.4 mass % of ethanol with respect to 100 mass % of the prepared composition material was further added as still another solvent, and the total fraction of the metallic materials in the composition material was adjusted to become 5 mass % in terms of the amount of metallic oxides. After that, the solution was further stirred at room temperature for 24 hours so as to prepare a ferrite thin film-forming composition material.

Next, the prepared ferrite thin film-forming composition material was spin-coated at a rotation rate of 3000 rpm for 15 seconds so as to form a coated film on a silicon substrate having a $SiO_2$ film on the surface, and then was calcined at a temperature of 400° C. for 5 minutes. The processes from coating to calcination were repeated five times so as to form an amorphous-form calcined film having a thickness shown in Table 3.

Finally, the film-attached substrate was fired at 700° C. by using RTA so as to form a NiCuZn ferrite thin film which had a composition of $(Ni_{0.40}Cu_{0.20}Zn_{0.40}O)_{1.0}(Fe_2O_3)_{1.0}$ and a thickness shown in Table 3.

Examples 3-2 and 3-3

Ferrite thin film-forming composition materials were prepared, and NiCuZn ferrite thin films having thickness shown in Table 3 were formed in the same manner as in Example 3-1 except that the fraction of acetonitrile was set to fractions shown in the following table 3 when the prepared composition material was set to 100 mass %.

Comparative Example 3-1

Firstly, as metallic materials, nickel nitrate (II) hexahydrate, copper nitrate (II) trihydrate, zinc nitrate (II) tetrahydrate and iron nitrate (III) nonahydrate were prepared and weighed respectively so that the composition of a formed ferrite thin film became $(Ni_{0.40}Cu_{0.20}Zn_{0.40}O)_{1.0}(Fe_2O_3)_{1.0}$. In addition, N,N-dimethylformamide was prepared as the solvent, this solvent was added to and mixed with the metallic materials, and the solution was stirred for 2 hours by using an oil bath.

After stirring, acetate was further added as a stabilizer, and the total fraction of the metallic materials in the composition material was adjusted to become 5 mass % in terms of the amount of metallic oxides. After that, polyvinylpyrrolidone (average molecular weight 40000) was further added at an amount corresponding to 50 mol % in terms of the amount of metallic oxides of the metallic materials, and the solution was stirred at room temperature for 24 hours so as to prepare a ferrite thin film-forming composition material.

In addition, a NiCuZn ferrite thin film having a thickness shown in Table 3 was formed in the same manner as in Example 3-1 using the prepared ferrite thin film-forming composition material.

Comparative example 3-2 and 3-3

Ferrite thin film-forming composition materials were prepared, and NiCuZn ferrite thin films having thickness shown in Table 3 were formed in the same manner as in Example 3-1 except that the fraction of acetonitrile was set to fractions shown in the following table 3 when the prepared composition material was set to 100 mass %.

Example 3-4 to 3-8 and Comparative Examples 3-4 to 3-7

Ferrite thin film-forming composition materials were prepared, and NiCuZn ferrite thin films having thickness shown in Table 3 were formed in the same manner as in Example 3-1 or 3-2 except that the fractions of the respective metallic materials was adjusted so that the compositions of the formed ferrite thin film became compositions shown in the following table 3.

<Comparison Test and Evaluation>

Figure 1:
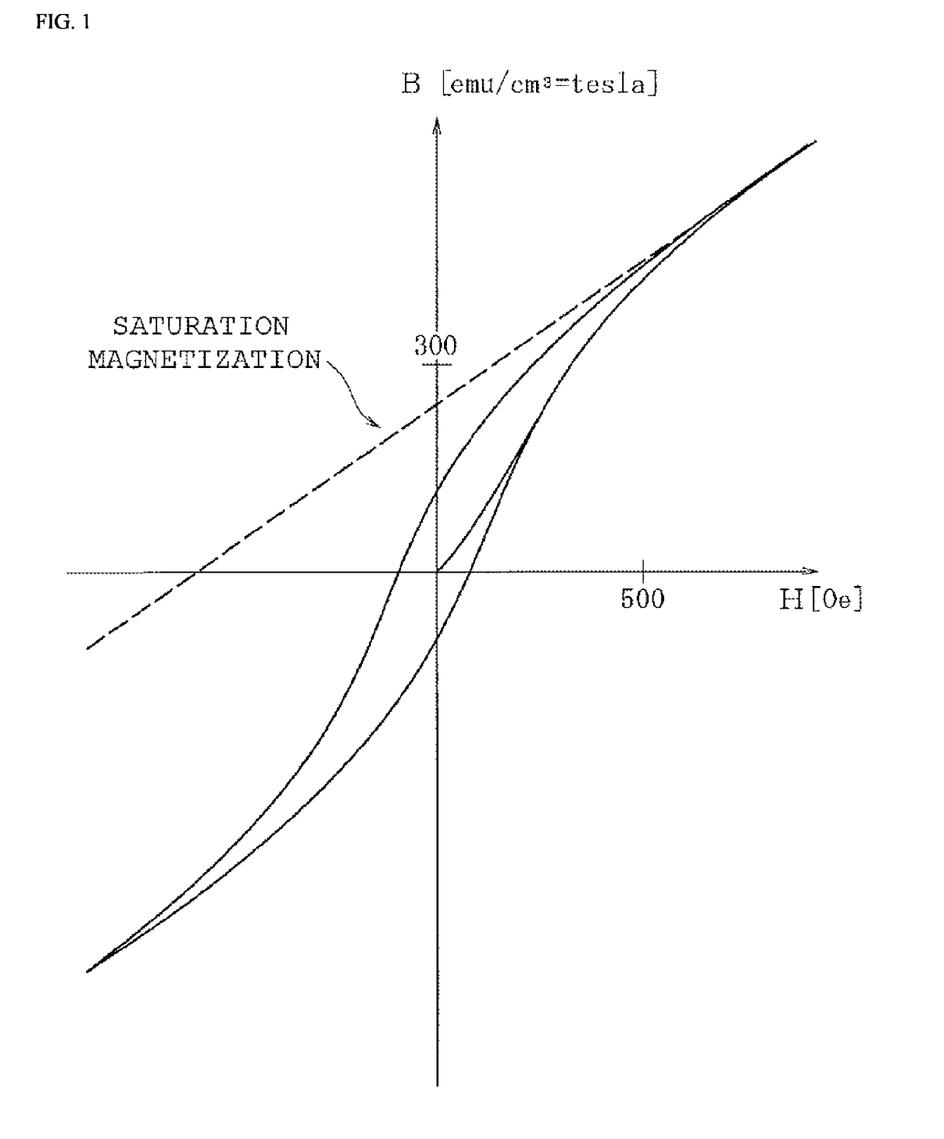
FIG. 1 is a view showing the magnetic hysteresis curve of a ferrite thin film obtained in Example 1-1.
Figure 2:
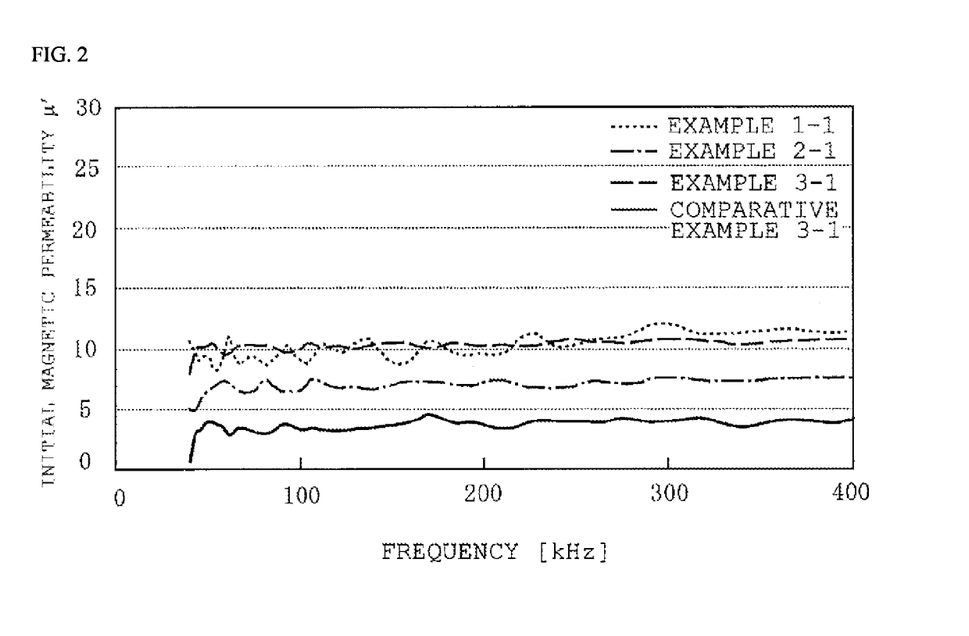
FIG. 2 is a graph showing the relationship between the frequency and the initial magnetic permeability in ferrite thin films obtained in Examples 1-1, 2-1 and 3-1 and Comparative example 3-1.
Figure 3:
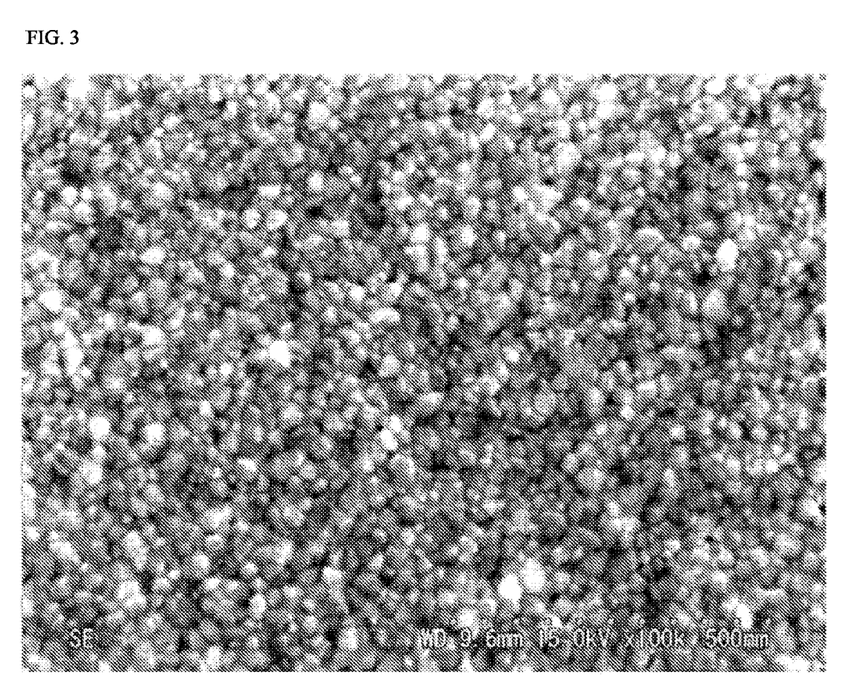
FIG. 3 is a photo of the ferrite thin film obtained in Example 1-1 when observed using a scanning electron microscope (SEM).
Figure 4:
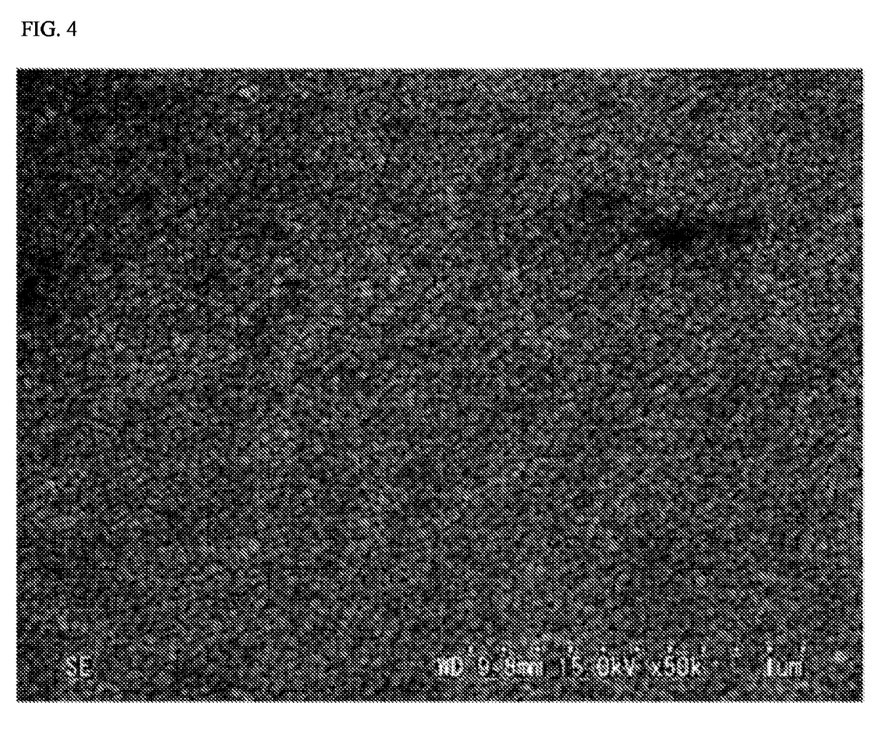
FIG. 4 is a photo of the ferrite thin film obtained in Example 3-1 when observed using a scanning electron microscope (SEM).
Figure 5:
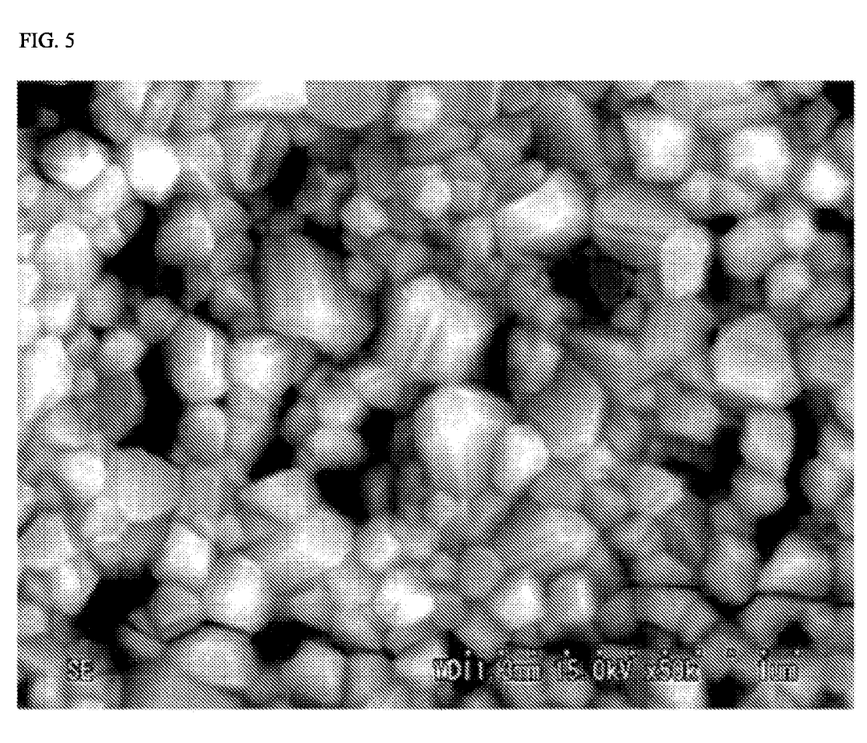
FIG. 5 is a photo of the ferrite thin film obtained in Comparative example 3-1 when observed using a scanning electron microscope (SEM).

For the ferrite thin films obtained in the examples and the comparative examples, the film thicknesses and the initial magnetic permeability were obtained by using the methods shown below. In addition, the storage stability of the prepared ferrite thin film-forming composition materials was evaluated. These results are shown in the following tables 1 to 3. In addition, the magnetic hysteresis curve (B-H curve) of the ferrite thin film obtained in Example 1-1 is shown in FIG. 1. In addition, the initial magnetic permeability of the ferrite thin films obtained in Examples 1-1, 2-1 and 3-1, and Comparative example 3-1 is shown in FIG. 2. Furthermore, photos of the ferrite thin films obtained in Example 1-1 and 3-1 and Comparative example 3-1 when observed using SEM are shown respectively in FIGS. 3, 4 and 5.

(1) Film thickness: the thickness of the cross-section of the formed thin film was measured by using a scanning electron microscope (manufactured by Hitachi, Ltd.: model s-4300). Meanwhile, the film thickness of the calcined film to be fired was also measured by using the same method and apparatus.

(2) Initial magnetic permeability: the initial magnetic permeability was measured at a frequency of up to approximately 40 MHz by using an absolute magnetic permeability measuring apparatus impedance analyzer (manufactured by Agilent Technologies, product name HP4194A) and an air core coil manufactured with a copper wire. Meanwhile, FIG. 2 shows the measurement results of up to 400 kHz. The air core coil was manufactured by making an outer shape of a size into which a 1 cm×5 cm-sized wafer contract with a thin plate of an acryl resin or the like, and winding the copper wire onto the outer shape 20 times to 80 times. After the impedance of the manufactured air core coil was measured by using an impedance analyzer, a 1 cm×5 cm-sized ferrite thin film-attached substrate was inserted as a core, and the impedance was measured again. At this time, the impedance difference ΔL before and after the insertion of the core can be obtained by using the following formula (1), and therefore it is possible to measure the initial magnetic permeability of a ferrite thin film.

$$\Delta L = \mu_0 \times \mu' \times S \times N^2 / l \quad (1)$$

However, in the above formula (1), $\mu_0$ represents the magnetic permeability of a vacuum, $\mu'$ represents the actual part of the complex magnetic permeability of the ferrite thin film (initial magnetic permeability), S represents the cross-sectional area of the ferrite thin film, N represents the winding number of the coil, and l represents the length of the coil.

(3) Storage stability: for the ferrite thin film-forming composition materials which had been refrigerated at a temperature of 5° C. for one month after preparation, the presence of sedimentation was visually confirmed. In Tables 1 to 3, "Poor" indicates a case in which sedimentation was confirmed in the stored ferrite thin film-forming composition material, and "Favorable" indicates a case in which sedimentation was not confirmed in the stored ferrite thin film-forming composition material.

While, in Comparative example 1-2 in which the content of acetonitrile exceeded 60 mass %, a favorable result was obtained for the storage stability, but a disadvantage of the occurrence of film variation occurred.

TABLE 1

| | Fraction of acetonitrile [mass %] | Composition (NiZn ferrite) | | | Thickness of calcined film [nm] | Thickness of ferrite thin film [nm] | Initial magnetic permeability | Storage stability |
|---|---|---|---|---|---|---|---|---|
| | | t | s | x | | | | |
| Example 1-1 | 30 | 1.0 | 1.0 | 0.36 | 600 | 400 | 10 | Favorable |
| Example 1-2 | 50 | 1.0 | 1.0 | 0.36 | 600 | 340 | 9 | Favorable |
| Example 1-3 | 60 | 1.0 | 1.0 | 0.36 | 600 | 300 | 8 | Favorable |
| Example 1-4 | 50 | 1.0 | 1.0 | 0.10 | 600 | 340 | 7 | Favorable |
| Example 1-5 | 50 | 1.0 | 1.0 | 0.65 | 600 | 340 | 8 | Favorable |
| Example 1-6 | 50 | 1.0 | 1.0 | 0.08 | 600 | 340 | 6 | Favorable |
| Example 1-7 | 50 | 1.0 | 1.0 | 0.67 | 600 | 340 | 5 | Favorable |
| Example 1-8 | 50 | 0.95 | 1.05 | 0.36 | 600 | 340 | 10 | Favorable |
| Example 1-9 | 50 | 1.05 | 0.95 | 0.36 | 600 | 340 | 10 | Favorable |
| Comparative example 1-1 | 27 | 1.0 | 1.0 | 0.36 | 600 | 425 | 9 | Poor |
| Comparative example 1-2 | 65 | 1.0 | 1.0 | 0.36 | 600 | 360 | 9 | Favorable |
| Comparative example 1-3 | 30 | 0.60 | 1.40 | 0.36 | 600 | 400 | 2 | Favorable |
| Comparative example 1-4 | 30 | 1.40 | 0.60 | 0.36 | 600 | 400 | 2 | Favorable |
| Comparative example 1-5 | 50 | 0.93 | 1.07 | 0.36 | 600 | 340 | 4 | Favorable |
| Comparative example 1-6 | 50 | 1.07 | 0.93 | 0.36 | 600 | 340 | 3 | Favorable |

As is evident from FIG. 1, since the saturation magnetization of the ferrite thin film obtained in Example 1-1 shows a high value of approximately 300 emu/cm$^3$, this thin film is determined to have a high magnetic characteristic.

In addition, as is evident from Table 1 and FIG. 2, the initial magnetic permeability of the ferrite thin film obtained in Example 1-1 showed a high value of 10. In addition, as is evident from FIG. 3, it is found that the ferrite thin film obtained in Example 1-1 has an extremely dense film quality having a grain size (crystal grain diameter) of approximately 20 nm, and is excellent in terms of the surface flatness of the film.

In addition, compared to Examples 1-1, 1-2 and 1-3, and Comparative example 1-1, in the ferrite thin film-forming composition material prepared in Comparative example 1-1 in which acetonitrile did not satisfy the content of 30 mass %, the composition material was a red and uniform liquid immediately after preparation, but green sedimentation was observed in the composition material after one month of refrigeration, and the storage stability was poor. In contrast to this, in the ferrite thin film-forming composition materials prepared in Examples 1-1, 1-2, and 1-3, it was confirmed that sedimentation was not observed in the composition material after one month of refrigeration, and the storage stability was excellent.

In addition, compared to Examples 1-1 to 1-3, 1-8, 1-9, and Comparative examples 1-3 to 1-6, regarding the composition of the obtained ferrite thin films, that is, a general formula $(Ni_{1-x}Zn_xO)_t(Fe_2O_3)_s$, in Comparative examples 1-3 and 1-4 in which s and t did not satisfy 0.95≤s≤1.05, 0.95≤t≤1.05, and s+t=2, the initial magnetic permeability showed an extremely low value of 2 respectively, and the initial magnetic permeability also showed a low value of 4 and 3 respectively in Comparative examples 1-5 and 1-6. In contrast to this, in Examples 1-1, 1-2, and 1-3 in which s and t satisfied the above conditions, the initial magnetic permeability showed extremely high values of 10, and 8 respectively, and the initial magnetic permeability showed an extremely high value of 10 in all of Examples 1-8 and 1-9. From the above results, it was confirmed that, in the NiZn ferrite thin films, it is effective to have a composition in which s and t satisfy 0.95≤s≤1.05, 0.95≤t≤1.05, and s+t=2.

In addition, compared to Examples 1-4, 1-5, 1-6 and 1-7, in Examples 1-4 and 1-5 in which x satisfies a range of 0.10≤x≤0.65, the initial magnetic permeability showed a high value compared to Example 1-6 and 1-7 in which x was outside the above range. From these results, it was confirmed that, in the NiZn ferrite thin films, it is preferable to have a composition in which x satisfies a range of 0.10≤x≤0.65.

TABLE 2

| | Fraction of acetonitrile [mass %] | Composition (CuZn ferrite) | | | Thickness of calcined film [nm] | Thickness of ferrite thin film [nm] | Initial magnetic permeability | Storage stability |
|---|---|---|---|---|---|---|---|---|
| | | t | s | x | | | | |
| Example 2-1 | 30 | 1.0 | 1.0 | 0.60 | 600 | 400 | 8 | Favorable |
| Example 2-2 | 50 | 1.0 | 1.0 | 0.60 | 600 | 340 | 7 | Favorable |
| Example 2-3 | 60 | 1.0 | 1.0 | 0.60 | 600 | 300 | 5 | Favorable |
| Example 2-4 | 50 | 1.0 | 1.0 | 0.20 | 600 | 340 | 5 | Favorable |
| Example 2-5 | 50 | 1.0 | 1.0 | 0.80 | 600 | 340 | 6 | Favorable |
| Example 2-6 | 50 | 1.0 | 1.0 | 0.18 | 600 | 340 | 4 | Favorable |

TABLE 2-continued

|  | Fraction of acetonitrile [mass %] | Composition (CuZn ferrite) | | | Thickness of calcined film [nm] | Thickness of ferrite thin film [nm] | Initial magnetic permeability | Storage stability |
|---|---|---|---|---|---|---|---|---|
|  |  | t | s | x |  |  |  |  |
| Example 2-7 | 50 | 1.0 | 1.0 | 0.82 | 600 | 340 | 5 | Favorable |
| Example 2-8 | 50 | 0.95 | 1.05 | 0.36 | 600 | 340 | 7 | Favorable |
| Example 2-9 | 50 | 1.05 | 0.95 | 0.36 | 600 | 340 | 8 | Favorable |
| Comparative example 2-1 | 27 | 1.0 | 1.0 | 0.60 | 600 | 425 | 7 | Poor |
| Comparative example 2-2 | 65 | 1.0 | 1.0 | 0.60 | 600 | 360 | 6 | Favorable |
| Comparative example 2-3 | 30 | 0.60 | 1.40 | 0.60 | 600 | 400 | 2 | Favorable |
| Comparative example 2-4 | 30 | 1.40 | 0.60 | 0.60 | 600 | 400 | 2 | Favorable |
| Comparative example 2-5 | 50 | 0.93 | 1.07 | 0.60 | 600 | 340 | 2 | Favorable |
| Comparative example 2-6 | 50 | 1.07 | 0.93 | 0.60 | 600 | 340 | 2 | Favorable |

As is evident from Table 2 and FIG. 2, the initial magnetic permeability of the ferrite thin film obtained in Example 2-1 showed a high value of 8.

In addition, compared to Examples 2-1, 2-2 and 2-3, and Comparative example 2-1, in the ferrite thin film-forming composition material prepared in Comparative example 2-1 in which acetonitrile did not satisfy the content of 30 mass %, the composition material was a red and uniform liquid immediately after preparation, but green sedimentation was observed in the composition material after one month of refrigeration, and the storage stability was poor. In contrast to this, in the ferrite thin film-forming composition materials prepared in Examples 2-1, 2-2, and 2-3, it was confirmed that sedimentation was not observed in the composition material after one month of refrigeration, and the storage stability was excellent.

While, in Comparative example 2-2 in which the content of acetonitrile exceeded 60 mass %, a favorable result was obtained for the storage stability, but a disadvantage of the occurrence of film variation occurred.

In addition, compared to Examples 2-1 to 2-3, 2-8, 2-9, and Comparative examples 2-3 to 2-6, regarding the composition of the obtained ferrite thin films, that is, a general formula $(Cu_{1-x}Zn_xO)_t(Fe_2O_3)_s$, in Comparative examples 2-3 to 2-6 in which s and t did not satisfy $0.95 \leq s \leq 1.05$, $0.95 \leq t \leq 1.05$, and $s+t=2$, the initial magnetic permeability all became 2, and showed an extremely low value. In contrast to this, in Examples 2-1, 2-2, and 2-3 in which s and t satisfied the above conditions, the initial magnetic permeability showed relatively high values of 8, 7 and 5 respectively, and the initial magnetic permeability showed high values of 7 and 8 respectively in Examples 2-8 and 2-9. From the above results, it was confirmed that, in the CuZn ferrite thin films, it is effective to have a composition in which s and t satisfy $0.95 \leq s \leq 1.05$, $0.95 \leq t \leq 1.05$, and $s+t=2$.

In addition, compared to Examples 2-4, 2-5, 2-6 and 2-7, in Examples 2-4 and 2-5 in which x satisfies a range of $0.20 \leq x \leq 0.80$, the initial magnetic permeability showed the same or larger value compared to Example 2-6 and 2-7 in which x was outside the above range. From these results, it was confirmed that, in the CuZn ferrite thin films, it is preferable to have a composition in which x satisfies a range of $0.20 \leq x \leq 0.80$.

TABLE 3

|  | Fraction of acetonitrile [mass %] | Composition (NiCuZn ferrite) | | | Thickness of calcined film [nm] | Thickness of ferrite thin film [nm] | Initial magnetic permeability | Storage stability |
|---|---|---|---|---|---|---|---|---|
|  |  | t | s | y |  |  |  |  |
| Example 3-1 | 30 | 1.0 | 1.0 | 0.40 | 600 | 400 | 10 | Favorable |
| Example 3-2 | 50 | 1.0 | 1.0 | 0.40 | 600 | 340 | 9 | Favorable |
| Example 3-3 | 60 | 1.0 | 1.0 | 0.40 | 600 | 300 | 10 | Favorable |
| Example 3-4 | 50 | 1.0 | 1.0 | 0.20 | 600 | 340 | 9 | Favorable |
| Example 3-5 | 50 | 1.0 | 1.0 | 0.18 | 600 | 340 | 8 | Favorable |
| Example 3-6 | 50 | 1.0 | 1.0 | 0.42 | 600 | 340 | 6 | Favorable |
| Example 3-7 | 50 | 0.95 | 1.05 | 0.40 | 600 | 340 | 9 | Favorable |
| Example 3-8 | 50 | 1.05 | 0.95 | 0.40 | 600 | 340 | 10 | Favorable |
| Comparative example 3-1 | — | 1.0 | 1.0 | 0.40 | 600 | 500 | 5 | Poor |
| Comparative example 3-2 | 27 | 1.0 | 1.0 | 0.40 | 600 | 425 | 7 | Poor |
| Comparative example 3-3 | 65 | 1.0 | 1.0 | 0.40 | 600 | 360 | 6 | Favorable |
| Comparative example 3-4 | 30 | 0.60 | 1.40 | 0.40 | 600 | 400 | 2 | Favorable |
| Comparative example 3-5 | 30 | 1.40 | 0.60 | 0.40 | 600 | 405 | 2 | Favorable |
| Comparative example 3-6 | 50 | 0.93 | 1.07 | 0.40 | 600 | 340 | 2 | Favorable |

TABLE 3-continued

| | Fraction of acetonitrile [mass %] | Composition (NiCuZn ferrite) | | | Thickness of calcined film [nm] | Thickness of ferrite thin film [nm] | Initial magnetic permeability | Storage stability |
|---|---|---|---|---|---|---|---|---|
| | | t | s | y | | | | |
| Comparative example 3-7 | 50 | 1.07 | 0.93 | 0.40 | 600 | 340 | 2 | Favorable |

As is evident from Table 3 and FIG. 2, compared to Examples 3-1, 3-2 and 3-3, and Comparative example 3-1, the initial magnetic permeability of the ferrite thin film obtained in Comparative example 3-1 in which acetonitrile was not included was 5 due to the low film density. In contrast to this, the initial magnetic permeability of the ferrite thin film obtained in Example 3-1 was 10, and the initial magnetic permeability showed high values of 9 and 10 respectively in Examples 3-2 and 3-3. In addition, as is evident from FIGS. 4 and 5, it is found that, compared to the ferrite thin film obtained in Comparative example 3-1, the ferrite thin film obtained in Example 3-1 has an extremely dense film quality having a grain size (crystal grain diameter) of approximately 20 nm, and is excellent in terms of the surface flatness of the film.

In addition, compared to Examples 3-1, 3-2 and 3-3, and Comparative examples 3-1, 3-2 and 3-3, in the ferrite thin film-forming composition materials prepared in Comparative example 3-1 in which acetonitrile was not included and Comparative example 3-2 in which acetonitrile did not satisfy the content of 30 mass %, the composition material was a red and uniform liquid immediately after preparation, but green sedimentation was observed in the composition material after one month of refrigeration, and the storage stability was poor. In addition, in Comparative example 3-3 in which the content of acetonitrile exceeded 60 mass %, a favorable result was obtained for the storage stability, but a disadvantage of the occurrence of film variation occurred. In contrast to this, in the ferrite thin film-forming composition materials prepared in Examples 3-1, 3-2, and 3-3, it was confirmed that sedimentation was not observed in the composition material after one month of refrigeration, and the storage stability was excellent.

In addition, compared to Examples 3-1 to 3-3, 3-7, 3-8, and Comparative examples 3-4 to 3-7, regarding the composition of the obtained ferrite thin films, that is, a general formula $(Ni_{0.80-y}Cu_{0.20}Zn_yO)_t(Fe_2O_3)_s$, in Comparative examples 3-4 to 3-7 in which s and t did not satisfy $0.95 \leq s \leq 1.05$, $0.95 \leq t \leq 1.05$, and s+t=2, the initial magnetic permeability all became 2, and showed an extremely low value. In contrast to this, in Comparative examples 3-1, 3-2, and 3-3 in which s and t satisfied the above conditions, the initial magnetic permeability showed relatively extremely high values of 10, 9 and 10 respectively, and the initial magnetic permeability showed extremely high values of 9 and 10 respectively in Examples 3-7 and 3-8. From the above results, it was confirmed that, in the NiCuZn ferrite thin films, it is effective to have a composition in which s and t satisfy $0.95 \leq s \leq 1.05$, $0.95 \leq t \leq 1.05$, and s+t=2.

In addition, compared to Examples 3-2, 3-4, 3-5 and 3-6, in Examples 3-2 and 3-4 in which y satisfies a range of $0.20 \leq y \leq 0.40$, the initial magnetic permeability showed a high value compared to Example 3-5 and 3-6 in which y was outside the above range. From these results, it was confirmed that, in the NiCuZn ferrite thin films, it is preferable to have a composition in which y satisfies a range of $0.20 \leq y \leq 0.40$.

INDUSTRIAL APPLICABILITY

The ferrite thin film-forming composition material of the invention can be preferably used to form a magnetic film and the like of a thin film inductor embedded in an integrated passive device (IPD) chip.

The invention claimed is:

1. A ferrite thin film-forming composition material for forming a ferrite thin film having a composition represented by $(Ni_{1-x}Zn_xO)_t(Fe_2O_3)_s$, $(Cu_{1-x}Zn_xO)_t(Fe_2O_3)_s$ or $(Ni_{0.80-y}Cu_{0.20}Zn_yO)_t(Fe_2O_3)_s$ by using a sol-gel method,
   wherein the composition material is formed by dissolving metallic raw materials in a solvent including a.) acetonitrile and b.) a lower alcohol or a diol, and a blending fraction of acetonitrile is 30 mass % to 60 mass % with respect to 100 mass % of the composition material and a blending fraction of the lower alcohol or diol is 15 mass % to 60 mass % with respect to 100 mass % of the composition material;
   wherein, x satisfies 0<x<1, y satisfies 0<y<0.80, s and t satisfy $0.95 \leq s \leq 1.05$ and $0.95 \leq t \leq 1.05$ respectively, and s+t=2.

2. The ferrite thin film-forming composition material according to claim 1,
   wherein the metallic raw materials are metal alkoxides, acetates, naphthenates, and nitrates of Ni, Zn, Cu or Fe.

3. The ferrite thin film-forming composition material according to claim 1,
   wherein, in a ferrite thin film having a composition represented by $(Ni_{1-x}Zn_xO)_t(Fe_2O_3)_s$, x is within a range of $0.10 \leq x \leq 0.65$.

4. The ferrite thin film-forming composition material according to claim 1,
   wherein, in a ferrite thin film having a composition represented by $(Cu_{1-x}Zn_xO)_t(Fe_2O_3)_s$, x is within a range of $0.20 \leq x \leq 0.80$.

5. The ferrite thin film-forming composition material according claim 1,
   wherein, in a ferrite thin film having a composition represented by $(Ni_{0.80-y}Cu_{0.20}Zn_yO)_t(Fe_2O_3)_s$, y is within a range of $0.20 \leq y \leq 0.40$.

6. The ferrite thin film-forming composition material according to claim 2,
   wherein, in a ferrite thin film having a composition represented by $(Ni_{1-x}Zn_xO)_t(Fe_2O_3)_s$, x is within a range of $0.10 \leq x \leq 0.65$.

7. The ferrite thin film-forming composition material according to claim 2,
   wherein, in a ferrite thin film having a composition represented by $(Cu_{1-x}Zn_xO)_t(Fe_2O_3)_s$, x is within a range of $0.20 \leq x \leq 0.80$.

8. The ferrite thin film-forming composition material according to claim 2,
   wherein, in a ferrite thin film having a composition represented by $(Ni_{0.80-y}Cu_{0.20}Zn_yO)_t(Fe_2O_3)_s$, y is within a range of $0.20 \leq y \leq 0.40$.

* * * * *